US007986793B2

(12) United States Patent
Wilson

(10) Patent No.: US 7,986,793 B2
(45) Date of Patent: Jul. 26, 2011

(54) AUTOMATICALLY RECONFIGURABLE STEREO SPEAKER SYSTEM

(76) Inventor: Kelce S. Wilson, Murphy, TX (US)

( * ) Notice: Subject to any disclaimer, the term of this patent is extended or adjusted under 35 U.S.C. 154(b) by 1096 days.

(21) Appl. No.: 11/753,647

(22) Filed: May 25, 2007

(65) Prior Publication Data

US 2008/0292120 A1 Nov. 27, 2008

(51) Int. Cl.
*H04B 3/00* (2006.01)

(52) U.S. Cl. ............... 381/81; 381/85; 381/123; 700/94

(58) Field of Classification Search .................. 381/300, 381/77, 80–81, 84–85, 123, 59; 700/94
See application file for complete search history.

(56) References Cited

U.S. PATENT DOCUMENTS

| | | | | |
|---|---|---|---|---|
| 5,910,991 | A * | 6/1999 | Farrar | 381/59 |
| 6,069,960 | A * | 5/2000 | Mizukami et al. | 381/74 |
| 6,928,175 | B1 * | 8/2005 | Bader et al. | 381/123 |
| 2005/0018857 | A1 * | 1/2005 | McCarty et al. | 381/58 |

* cited by examiner

*Primary Examiner* — Devona E Faulk
*Assistant Examiner* — Disler Paul
(74) *Attorney, Agent, or Firm* — Kelce S. Wilson

(57) ABSTRACT

An embodiment of an audio system comprises a speaker system configured to automatically change a coupling of an audio speaker from a first channel input to a second channel input if an external speaker is coupled to a first output. In embodiments of the invention, the speaker that connects to an audio source, such as an audio card of a personal computer (PC), automatically swaps channels based on the jack into which an external speaker is plugged. Thus, the reconfiguration of the audio system is automatic for the user in some embodiments, requiring nothing more from the user than selecting one of two jacks for use with an external speaker.

7 Claims, 2 Drawing Sheets

AUTOMATICALLY RECONFIGURABLE STEREO SPEAKER SYSTEM

TECHNICAL FIELD

The invention relates generally to audiovisual devices and, more particularly, to audio speaker systems.

BACKGROUND

Audio speakers for personal computer (PC) systems typically come in a set comprising a powered speaker and an unpowered speaker. The powered speaker plugs into the audio output of a PC using a stereo 3.5 millimeter (mm) jack, also known as a ⅛ inch stereo jack. The powered speaker typically has an amplifier, a volume control, a power switch, a power supply connector, and a monaural (mono) 3.5 mm female connector for coupling to the unpowered speaker. The powered speaker may optionally have a balance control, one or more tone controls and a subwoofer output.

Generally, the powered speaker is the right channel of a stereo pair of audio channels. The powered speaker connects directly to the PC to receive the stereo channels, plays the right channel, and passes an amplified left channel signal to the unpowered speaker. If the PC is located to the right side of a user's workpace, this configuration results in a reasonably efficient cable layout. However, if the PC is located on the left side of a user's workspace, the stereo cable coupling the powered speaker to the PC has to cross the user's workspace, or be routed behind the user's workspace, in order to place each of the speakers in its correct location.

The extra distance required when the powered speaker and the PC are on opposite sides of a user's workspace results in an inefficient cable layout, in which the stereo cable is often not long enough. Previous solutions to this problem include (1) purchasing a stereo extension cable for an additional sum of money; (2) placing the speakers in locations opposite their stereo position, thus enduring reversed-direction audio; and (3) moving either the PC or the powered speaker to an awkward, less-desirable location so that the cable will reach.

SUMMARY

The current invention solves a long-felt need that had been previously (and poorly) addressed by the above-described sub-optimal solutions. In embodiments of the invention, the speaker that connects to the personal computer (PC) is configured to automatically swap channels based on the jack into which the secondary speaker is plugged. Thus, the reconfiguration of the audio system is automatic for the user in some embodiments, requiring nothing more from the user than selecting one of two jacks for use with an external speaker.

An embodiment of an audio system comprises an automatically reconfigurable stereo speaker system. The speaker system is configured to automatically change a coupling of an audio speaker from a first channel input to a second channel input if an external speaker is coupled to a first output. The first output comprises a first switch, which comprises first, second and third nodes. The first node is coupled to the audio speaker, the second node is coupled to the first channel input, and the third node is coupled to the second channel input. The first switch is configured to automatically couple the first node to the third node upon the external speaker coupling to the first output and to automatically couple the first node to the second node upon the external speaker decoupling from the first output. In some embodiments, the first switch comprises a mechanically-actuated switch configured to automatically couple the first node to the third node upon a 3.5 millimeter (mm) male jack coupling to the first output and to automatically decouple the first node from the third node upon the 3.5 mm male jack decoupling from the first output.

Embodiments of the invention are also applicable to stereo video or other multi-screen video displays. An embodiment of an audiovisual system comprises a first signal conversion device comprising a first output and a second output, wherein the first signal conversion device is configured to accept a plurality of incoming signals, and wherein the first signal conversion device is configured to convert a first one of the plurality of incoming signals if no external device is coupled to the first output and to convert a second one of the plurality of incoming signals if an external device is coupled to the first output. The first signal conversion device may be an audio speaker or a visual display, and the plurality of incoming signals may be a pair of audio channels or a pair of video channels.

The foregoing has outlined the features and technical advantages of the invention in order that the description that follows may be better understood. Additional features and advantages of the invention will be described hereinafter. It should be appreciated by those skilled in the art that the conception and specific embodiments disclosed may be readily utilized as a basis for modifying or designing other structures for carrying out the same purposes of the present invention. It should also be realized by those skilled in the art that such equivalent constructions do not depart from the spirit and scope of the invention as set forth in the claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the invention.

BRIEF DESCRIPTION OF THE DRAWINGS

For a more complete understanding of the present invention, reference is now made to the following descriptions taken in conjunction with the accompanying drawings, in which.

DETAILED DESCRIPTION

Figure 1:
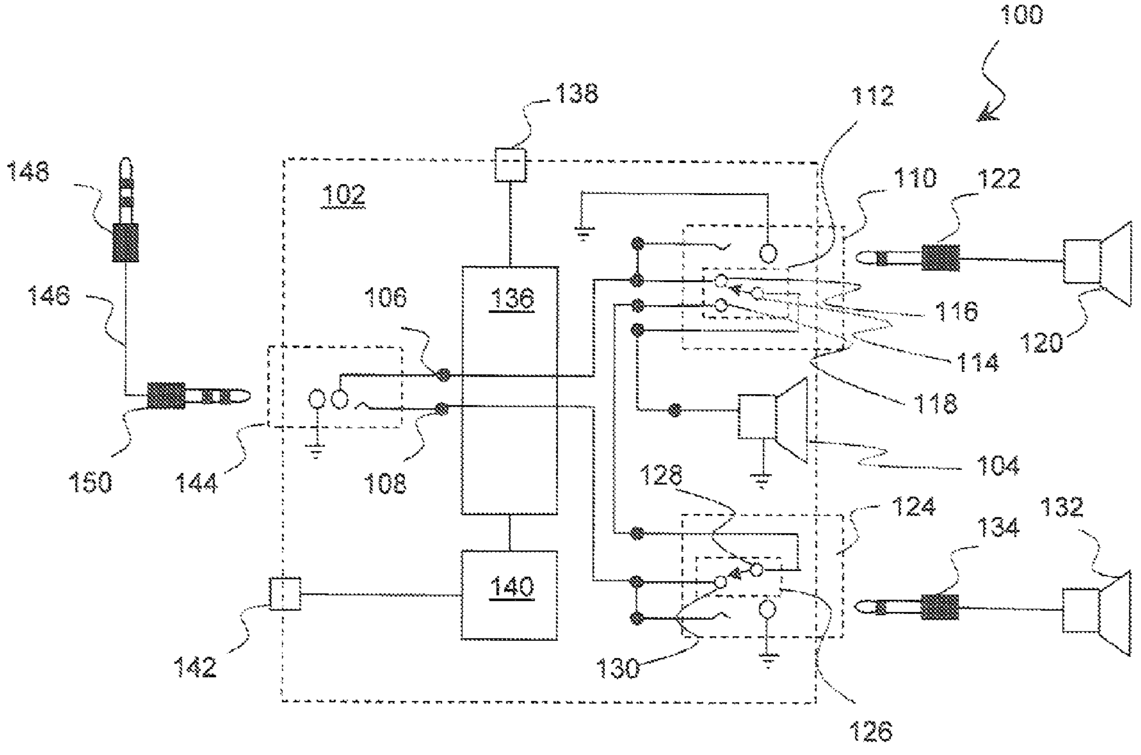
FIG. 1 illustrates an embodiment of an audio system.

FIG. 1 illustrates an embodiment of an audio system 100 comprising a speaker system 102 configured to automatically change a coupling of an audio speaker 104 from a first channel input 106 to a second channel input 108 if an external speaker 120 is coupled to a first output 110. As shown, external speaker 120 is configured to couple to speaker system 102 through jack 122. Jack 122 comprises a 3.5 millimeter (mm) male jack in the illustrated embodiment. It should be understood, however, that a video system could be similarly configured, in which a video display comprises a multi-channel input a screen and an output, and selects one of the input channels for display and the other channel for output to a secondary display. In some embodiments, first channel input 106 and second channel input 108 comprise the right and left channels of a stereo audio pair.

In the illustrated embodiment, first output 110 comprises a monaural (mono) 3.5 mm female connector and a first switch 112, although a different connector may be used in some embodiments. First switch 112 comprises a first node 114, a second node 116, and a third node 118. First node 114 is coupled to audio speaker 104, second node 116 is coupled to first channel input 106, and third node 118 is coupled to second channel input 108. First switch 112 is selectively configurable to couple first node 114 to either second node 116 or to third node 118. Third node 118 is illustrated as coupled to second channel input 108 through a second switch 126, although some embodiments do not include second switch 126. First switch 112 is configured to automatically couple first node 114 to third node 118 and to decouple first node 114 from second node 116 upon external speaker 120 coupling to first output 110 using jack 122. First switch 112 is further configured to automatically couple first node 114 to second node 116 and to decouple first node 114 from third node 118 upon jack 122 decoupling from first output 110. In some embodiments, first switch 112 comprises a mechanically-actuated single pole double throw (SPDT) switch that is spring-loaded (biased) to couple first node 114 to second node 116 when jack 122 is outside first output 110, but is actuated to couple first node 114 to third node 118 when jack 122 is inserted into first output 110.

As shown, speaker system 102 of audio system 100 further comprises a second output 124. Second output 124 is configured to couple to an external speaker 132 using jack 134. In some embodiments, external speaker 132 and jack 134 are similar to external speaker 120 and jack 122. Second output 124 comprises a mono 3.5 mm female connector and a second switch 126. It should be noted, however, that second output 124 may comprise a different connector, and some embodiments exclude second switch 126. In the illustrated embodiment, second switch 126 comprises a fourth node 128 and a fifth node 130. Fourth node 128 is coupled to third node 118, and fifth node 130 is coupled to second channel input 108. Second switch 126 is selectively configurable to couple fourth node 128 to fifth node 130, or to decouple fourth node 128 from fifth node 130. Second switch 126 is configured to automatically decouple fourth node 128 from fifth node 130 upon jack 134 coupling to second output 124. Second switch 126 is further configured to automatically couple fourth node 128 to fifth node 130 upon jack 134 decoupling from second output 124. In some embodiments, second switch 126 comprises a mechanically-actuated single pole single throw (SPST) switch that is spring-loaded (biased) to couple fourth node 128 to fifth node 130, but is actuated to decouple fourth node 128 from fifth node 130 when jack 134 is inserted into second output 124.

In operation, the illustrated embodiment of speaker system 102 performs in the following manner: With no external speakers 120 or 132 connected to speaker system 102, audio speaker 104 plays the audio signal present on first channel input 106. First switch 112 has first node 114 coupled to second node 116, and second switch 126 has fourth node 128 coupled to fifth node 130. The signal on first channel input 106 is routed through second node 116 and first node 114, in first switch 110, to audio speaker 104. If jack 134 is then connected to second output 124, external speaker 132 couples to second channel input 108. Second switch 126 is actuated to decouple fourth node 128 from fifth node 130, however, in this configuration for the illustrated embodiment, the decoupling of fourth node 128 from fifth node 130 has minimal consequences. The signal on second channel input 108 is routed through second output 124 and jack 134 to external speaker 132. In this first dual-speaker configuration, audio speaker 104 plays the audio signal present on first channel input 106, and external speaker 132 plays the audio signal present on second channel input 108.

Consider next the scenario in which external speaker 132 is decoupled from second channel input 108 by disconnecting jack 134 from second output 124, and switch 126 returns to its biased configuration. If jack 122 is then connected to first output 110, external speaker 120 couples to first channel input 106. First switch 112 is actuated to decouple first node 114 from second node 116 and to couple first node 114 to third node 118. The signal on first channel input 106 is routed through first output 110 and jack 122 to external speaker 120. The signal on second channel input 108 is routed through fifth node 130 and fourth node 128, in second switch 126, through third node 118 and first node 114, in first switch 112, to audio speaker 104. Note that in embodiments that omit second switch 126, the routing through fifth node 130 and fourth node 128 is avoided. In this second dual-speaker configuration, audio speaker 104 plays the audio signal present on second channel input 108, and external speaker 120 plays the audio signal present on first channel input 106.

Thus, speaker system 102 has been automatically reconfigured, using no more input from the user than the selection of first output 110 rather than second output 124 for connecting an external speaker. In the manner of operation described above, an embodiment of speaker system 102 automatically changes the coupling of audio speaker 104 from first channel input 106 to second channel input 108 when external speaker 120 is coupled to first output 110. By plugging jack 122 into first output 110, audio speaker 104 plays signals on second channel input 108, while external speaker 120 plays signals on first channel input 106. However, by plugging jack 134 into second output 124, audio speaker 104 plays signals on first channel input 106, while external speaker 132 plays signals on second channel input 108. Thus, audio speaker 104 can play either the right or left channel of a stereo audio pair, based only upon which output, 110 or 124, an external jack is plugged into.

In the illustrated embodiment, speaker system 102 has additional features. Speaker system 102 additionally comprises an amplifier 136, a subwoofer connector 138, a power supply 140, a power supply connector 142, and an input connector 144. Amplifier 136 may typically comprise volume, balance and tone controls and is illustrated as electrically disposed between input connector 144 and audio speaker 104. Amplifier 136 amplifies signals present on first channel input 106 and second channel input 108, and also outputs a signal to subwoofer connector 138. In some embodiments, amplifier 136 is configured to sense the absence of any external speaker and play a combination of both first channel input 106 and second channel input 108 over audio speaker 104. Power supply 140 may typically comprise a power switch and provides power to amplifier 136. In some embodiments, power supply 140 couples to an external source of power through power supply connector 142. In some embodiments, power supply 140 comprises a battery powered supply. Input connector 144 brings signals on first channel input 106 and second channel input 108 into speaker system 102 from an external source. In some embodiments, input connector 144 comprises a stereo 3.5 mm female connector. In some embodiments, speaker system 102 may further comprise an internal audio source, such as, for example a radio receiver, a compact disk (CD) player, or a digital audio player.

In the illustrated embodiment, audio system 100 has additional features. Audio system 100 additionally comprises a stereo cable 146, which is terminated with a stereo 3.5 mm male jack 148 on one end and a stereo 3.5 mm male jack 150 on the opposite end. Jack 148 is configured to couple to an audio output of a personal computer (PC) or any other audio device having a 3.5 mm female connector. Jack 150 is configured to couple to input connector 144. In some embodiments, jacks 148 and/or 150 comprise connectors other than stereo 3.5 mm male jacks.

The embodiment illustrated in FIG. 1 has an additional, optional feature. If, while external speaker 120 is coupled to speaker system 102, external speaker 132 is also coupled to speaker system 102, audio speaker 104 then becomes decoupled from both first channel input 106 and second channel input 108. This feature could be useful in the event that both external speakers 120 and 132 were higher quality or better-sounding than audio speaker 104 contained within speaker system 102. External speakers 120 and 132 can thus leverage features of speaker system 102, such as amplifier 136 and subwoofer connector 138, and power supply 140, without requiring the use of audio speaker 104.

In general, first switch 112 may be considered as a channel selector for audio speaker 104, since the configuration of first switch 112 selects whether audio speaker 104 is coupled to first channel input 106 or second channel input 108. Further, audio speaker 104 may be considered a signal conversion device, because an audio speaker converts electrical signals into sound energy. Likewise, a video screen may also be considered a signal conversion device, because a video screen converts electrical signals into light energy. Thus embodiments of the invention include automatically reconfigurable display systems.

Figure 2:
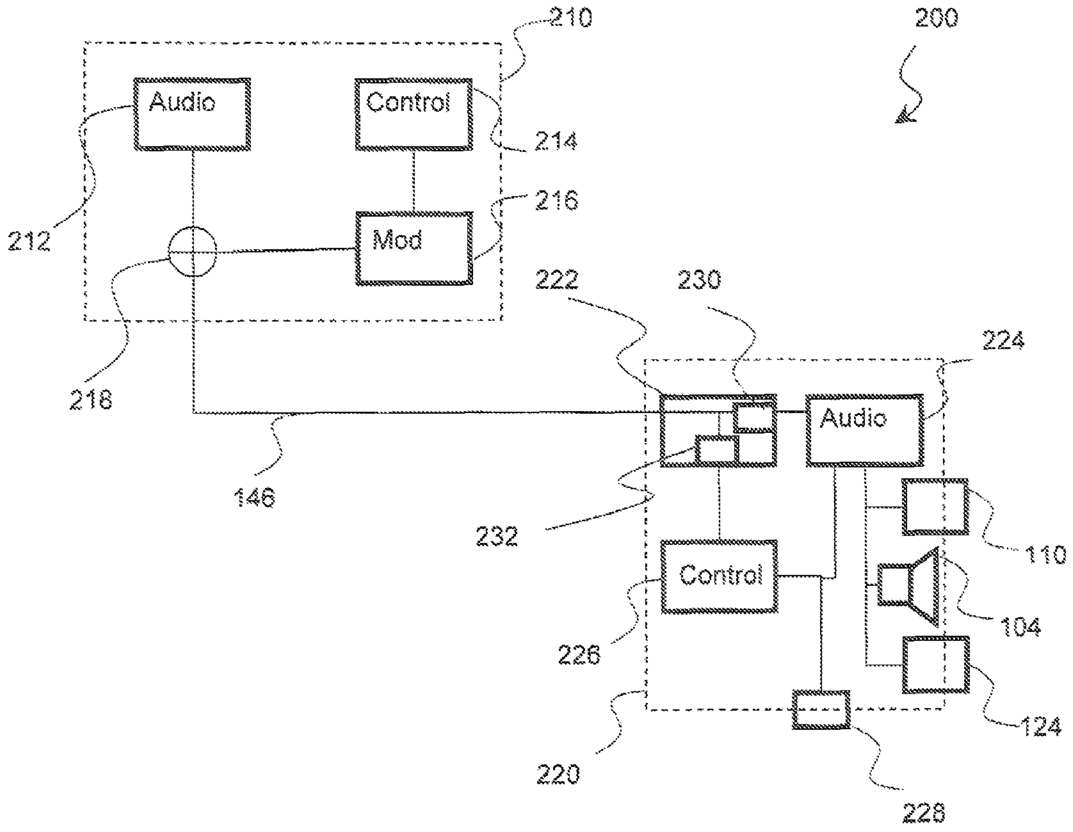
FIG. 2 illustrates another embodiment of an audio system.

Turning now to FIG. 2, an alternate embodiment of an audio system is illustrated. An alternate solution to automatic reconfiguration using a selection of output connections would be to place a switch on or in the powered speaker, but separately operable from a switch (if any) associated with first output 110. This extra switch would be configured so that, in one position, the right stereo audio channel is routed to the powered speaker and the left stereo audio channel is routed to the unpowered speaker. The channel assignments then swap when the switch is in a different configuration. This solution may require the user to actuate the switch to swap the channels. However, if the switch is electronically controlled, it could be actuated remotely, for example by a PC or other audio device.

Unfortunately, adding another communication path between the PC and an external speaker system adds complexity, whether the communication path is wired or wireless. However, control signals, for example volume, balance, tone and power control, in addition to a stereo channel swap control, could be sent from the PC to the speaker system using an existing stereo cable. This is because audio signals are generally limited to 20 kilohertz (KHz) and below, whereas existing stereo cables are fully capable of carrying signals at higher frequencies. Wireless technology is prevalent for use with PCs, however, the frequency spectrum is becoming crowded and is noisy. Further, with multiple wireless devices, such as a keyboard, mouse and router, all interfacing with the same PC, a new device may interfere with one of the other peripherals or even another common wireless device, such as a wireless telephone or building alarm system. A wired connection is thus desirable in some situations.

An exemplary system incorporating both a user-actuable switch for swapping the stereo channels, as well as a remote control feature using a standard stereo cable, is illustrated in FIG. 2. In the illustrated embodiment, system 200 comprises a PC 210 and a remote device 220. PC 220 comprises an audio module 212, a control module 214, a modulator 216 and a node 218. Audio module 212, is coupled to node 218. Control module 214 is coupled to modulator 216, which is also coupled to node 218.

Audio module 212 provides audio signals for playing over an audio speaker, and may comprise standard PC audio card hardware, firmware and software. Control module 214 provides control functions for the remote device 220, for example volume, tone, balance, power, and stereo channel swap control in some embodiments. Control module 214 comprises the necessary hardware, firmware and software for sending control signals to remote device 220. Modulator 216 receives signals from control module 214 and modulates them to place the signals above audio frequencies, for example above 20 KHz, to minimize interference of the control signals with the audio signals. Any form of modulation may be used, although a modulation scheme that minimizes audio frequency interference is preferred. In some embodiments, modulator 216 may be incorporated into control module 214. Audio signals and modulated control signals are combined at node 218 and relayed to remote device 220 via a connection system 146, which may be a standard stereo cable comprising one or more stereo 3.5 mm jacks as described above with reference to FIG. 1

In the illustrated embodiment, remote device 220 comprises a separator 222, an audio module 224, a controller 226, a switch 228, audio speaker 104 and first output 110. Separator 222 is coupled to node 218 in PC 210 and is also coupled to audio module 224 and controller 226. Audio module 224 is further coupled to controller 226, switch 228 and audio speaker 104, along with first output 110 for coupling to an external speaker. Audio module 224 may comprise amplifier 136 and other circuitry, as described with reference to speaker system 102 of FIG. 1, which is necessary to enable remote device 220 to function as part of a powered stereo speaker system. Also, controller 226 is illustrated as coupled to switch 228 to enable control of switch 228 from PC 210, although some embodiments may omit one or more of controller 226, switch 228, and a coupling between controller 226 and switch 228. Controller 226 provides input to audio module 224 for controlling the sound played over audio speaker 104 and/or other external speakers, for example volume, tone and balance control.

Switch 228 enables a user to select whether the left or right stereo channel plays over audio speaker 104 and whether the left or right stereo channel is routed to first output 110. Audio module 224 determines the setting of switch 228 and routes either the left or right stereo channel to audio speaker 104. In some embodiments, switch 228 comprises a mechanical switch requiring actuation by a user. In some embodiments, switch 228 comprises an electrically-controllable switch that is controllable only by controller 226. In some embodiments, switch 228 comprises an electrically-controllable switch that is controllable both by controller 226 and also by a user's touch.

Separator 222 is configured to separate audio signals from control signals, and route audio signals to audio module 224 and control signals to controller 226. In the illustrated embodiment, separator 222 comprises a low pass filter (LPF) 230, which passes signals to audio playback module 224, and also a high pass filter (HPF) 232, which passes signals to controller 226. In some embodiments, LPF 230 passes only audio frequency signals, for example signals below approximately 20 KHz, whereas HPF 232 passes only signals above audio frequencies. However, it should be understood that separator 222 may use another signal separation method to prevent control signals and/or modulated control signals from entering audio module 224. In some embodiments, controller

226 may be configured to ignore audio frequency signals, and thus not require blocking of audio signals by separator 222.

Although FIG. 2 is described with reference to a PC 210, some embodiments may comprise a different device coupled to remote device 220, such as, for example, an audio device, a communication device, a desktop computer, a game device, a measurement device, a notebook computer, a personal digital assistant (PDA), and a video device. In some embodiments, remote device 220 comprises all the features of speaker system 102, including second output 124.

Although the present invention and its advantages have been described, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. An audio system comprising:

a speaker system configured to automatically change a coupling of an audio speaker from a first channel input to a second channel input if an external speaker is coupled to a first output;

wherein the first output comprises:

a first switch comprising:

a first node;

a second node; and a third node, wherein the first switch is selectively configurable to couple the first node to either the second node or to the third node, wherein the first node is coupled to the audio speaker, wherein the second node is coupled to the first channel input, and wherein the third node is selectively coupled to the second channel input; and a second output comprising:

a second switch comprising:

a fourth node; and a fifth node, wherein the second switch is selectively configurable to couple the fourth node to the fifth node or to decouple the fourth node from the fifth node, wherein the second switch is configured to automatically decouple the fourth node from the fifth node upon an external speaker coupling to the second output, wherein the second switch is configured to automatically couple the fourth node to the fifth node upon an external speaker decoupling from the second output, wherein the fourth node is coupled to the third node, and wherein the fifth node is coupled to the second channel input.

2. The audio system of claim 1 wherein the first switch comprises a mechanically-actuated switch configured to automatically couple the first node to the third node upon a 3.5 millimeter (mm) male jack coupling to the first output and to automatically decouple the first node from the third node upon the 3.5 mm male jack decoupling from the first output.

3. The audio system of claim 1 wherein the first output and the second output each comprises a 3.5 millimeter (mm) female connector.

4. The audio system of claim 1 wherein the first output and the second output each comprises a mono 3.5 millimeter (mm) female connector.

5. The audio system of claim 1 further comprising:

an input connection system coupled to the audio speaker.

6. The audio system of claim 5 wherein the input connection system comprises at least one selected from the group consisting of a stereo 3.5 millimeter (mm) male jack and a stereo 3.5 mm female connector.

7. The audio system of claim 5 further comprising:

an amplifier electrically disposed between the input connection system and the audio speaker.

* * * * *